Feb. 5, 1946.  H. B. BISCOW  2,394,140
OBSTETRICAL MEASURING INSTRUMENT
Filed Dec. 18, 1943
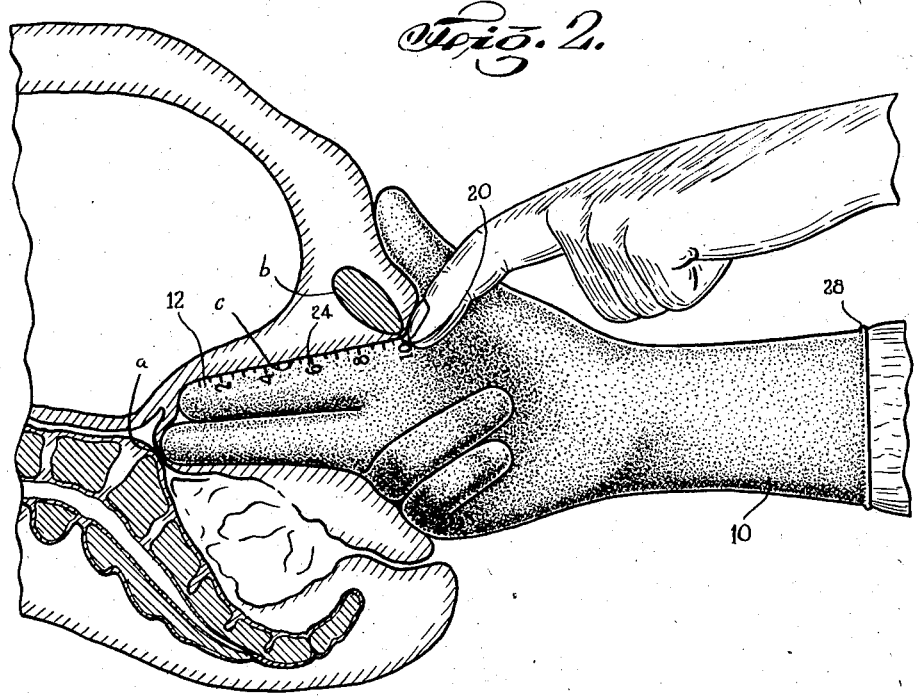
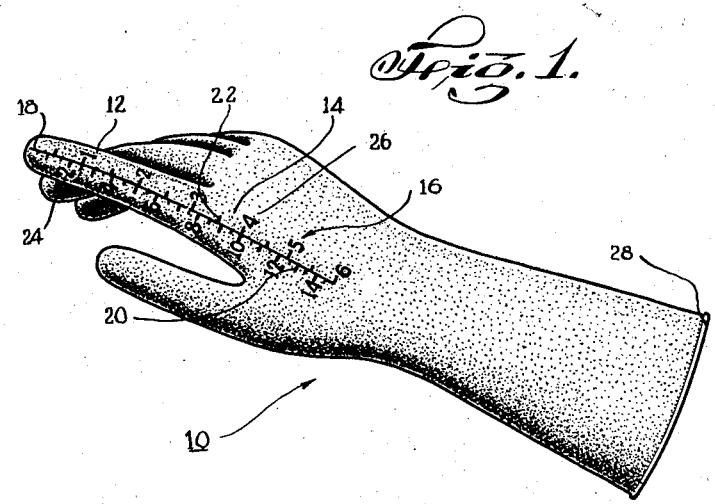
INVENTOR
HARRY B. BISCOW
BY
ATTORNEY Patented Feb. 5, 1946

2,394,140

UNITED STATES PATENT OFFICE 2,394,140

OBSTETRICAL MEASURING INSTRUMENT

Harry B. Biscow, New York, N. Y.

Application December 18, 1943, Serial No. 514,742

6 Claims. (Cl. 128—361)

This invention relates to obstetrical measuring instruments.

It is an object of the invention to provide an improved instrument of the character described for easily and directly measuring the true conjugate diameter without the aid of an assistant.

It is another object of the invention to provide an instrument of the character described which is simple in construction, inexpensive to manufacture and easily sterilized, occupies so little space when not in use that a physician can consequently carry it along with him, is not easily broken, and does not require any special instructions or technique in its use, the construction thereof being such that the device is merely slipped on the hand like a glove, and the physician then proceeds to manually measure the diagonal conjugate diameter in the hereinafter described manner.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawing, in which is shown one of the various possible embodiments of this invention, Fig. 1 is a perspective view of an obstetrical measuring instrument embodying the invention, and Fig. 2 is an anterior-posterior section through a groin showing the instrument in use.

The true conjugate diameter, of which my improved obstetrical instrument 10 is adapted to give a direct measure, is the distance from the promontory $a$ of the sacrum to the inner, upper surface $b$ of the symphysis pubis. Heretofore this diameter has been measured either manually or with the use of complicated instruments.

When this measurement is taken manually, the physician inserts his index and middle fingers, stiffly extended, inwardly and upwardly into the vagina $c$ until the tip of the middle finger rests upon the promontory of the sacrum. He then places a finger of his other hand close to or a little under the symphysis pubis and presses this finger against the examining hand. The examining hand is then withdrawn, with the finger of the other hand in position thereon, and an assistant, by means of a pair of external calipers, known as a pelvimeter, then measures the distance from the tip of the middle finger of the examining hand to the point thus marked off. This distance is the diagonal conjugate diameter and differs from the true conjugate diameter by from one and one-half to two centimeters on an average. To obtain the true conjugate diameter the physician therefore deducted from one and one-half to two centimeters, or from six to eight-tenths of an inch from the diagonal conjugate diameter just measured.

The true conjugate diameter has also been measured with different types of metallic instruments including calipers with extensible legs for measuring the thickness of the symphysis pubis and the distance from the promontory of the sacrum to the outer, upper surface of the symphysis pubis. Also another such instrument for direct measurement of the true conjugate diameter has a sliding angle bar abutting the inner surface of the symphysis pubis. All these instruments must be used with extreme care since a hard surface thereof is firmly pressed against a mucous surface over a bone, and traumatism may easily result. These instruments are also bulky, difficult to carry, hard to sterilize and break easily.

In accordance with my invention I have provided an instrument for direct mensuration of the true conjugate diameter which obviates the disadvantages inherent in the foregoing instruments and procedures.

Said instrument essentially constitutes a flexible sheath for the index finger which extends over the base knuckle rearwardly toward the wrist and which has a measuring scale thereon whose zero point is at the tip of the sheath. My said instrument is based upon an observation I have made that in the average adult hand the distance from the tip of the middle finger to the tip of the index finger, measured axially of the fingers, is approximately the same as the difference between the diagonal and true conjugate diameters. Because of this difference in the length of the fingers, if my instrument is worn on the examining hand and conventional procedure is followed for manual measurement of the diagonal conjugate diameter, the point on the scale on which the finger of the non-examining hand rests is the true conjugate diameter of the patient being measured.

Referring now to the drawing, I have there shown my obstetrical instrument 10 in the form of a glove of flexible easily sterilized material such as rubber which includes a sheath 12 for the index finger having a rearward extension 14 running back from the base of said finger over the metacarpel and towards the wrist. The instrument is embodied in a glove to facilitate sterile procedure and to provide means to hold the rearward extension against the back of the hand. The sheath has imprinted thereon a scale 16 extending axially from the tip of the finger rearwardly toward the wrist and disposed on the side of the sheath corresponding to the outer side of the index finger. Said scale includes a base line 18 parallel to the axis of the sheath and two sets of graduations 20, 22 one on each side of the line. These graduations mark off conventional units of length, the graduations 20 indicating centimeters and the graduations 22 inches. Obviously only one set of graduations is necessary. The zero point of the scale is substantially at the tip of the index finger sheath. By this it is not meant that an actual zero and a graduation mark must be imprinted at the tip of said sheath but merely that the indicating numerals 24, 26 associated with the graduations 20, 22 respectively are in such order that the scale originates from said tip, i. e., if the graduations and numerals were continued in regular succession, the zero of the scale would be at said tip. Also other low numerals and graduations on the scale need not be imprinted on the glove since, obviously, if the pelvic inlet is so very small, the exact measurement of the true conjugate diameter is not needed. A reinforcing rib 28 may be formed at the rear edge of the glove.

In use the glove is donned on the examining hand and the index and middle fingers thereof stiffly extended and inserted inwardly and upwardly into the vagina of the supine patient, with the index finger between the middle finger and the symphysis pubis, until the tip of the middle finger presses against the promontory of the sacrum, as shown in Fig. 2. Then a finger of the free hand is pressed against the lower edge of the symphysis pubis and against the index finger sheath 12, or its rearward extension 14, of the examining hand as well, as also shown in Fig. 2. A reading is now taken on the scale 16 where the finger of the non-examining hand rests. This reading is the true conjugate diameter of the patient since it is the diagonal conjugate diameter less the difference in the heights of the middle and index fingers, the latter difference being approximately equal to the variance between the true and conjugate diameters.

It will thus be seen that there is provided a device and method of using the same in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. An obstetrical instrument adapted to be worn on the examining hand for directly measuring the true conjugate diameter from the promontory of the sacrum to the upper inner surface of the symphysis pubis, said instrument comprising an index finger sheath having a rearward extension adapted to lie on the back of the hand and extend towards the wrist and an axial scale on said sheath whose zero point is substantially at the tip of the sheath so that it is spaced rearwardly from the tip of the middle finger of the hand a distance equal to the difference between the diagonal and true conjugate diameters, whereby, when the tip of the middle finger of the hand rests on the promontory of the sacrum, the point of said scale beneath the lower edge of the symphysis pubis is the length of the true conjugate diameter.

2. An obstetrical instrument adapted to be worn on the examining hand for directly measuring the true conjugate diameter from the promontory of the sacrum to the upper inner surface of the symphysis pubis, said instrument comprising an index finger sheath having a rearward extension adapted to lie on the back of the hand and extend towards the wrist and an axial scale on the side of said sheath corresponding to the outer side of the index finger of the hand, the zero point of said scale being substantially at the tip of the sheath so that it is spaced rearwardly from the tip of the middle finger of the hand a distance equal to the difference between the diagonal and true conjugate diameters, whereby, when the tip of the middle finger of the hand rests on the promontory of the sacrum, the point of said scale beneath the lower edge of the symphysis pubis is the length of the true conjugate diameter.

3. An obstetrical instrument adapted to be worn on the examining hand for directly measuring the true conjugate diameter from the promontory of the sacrum to the upper inner surface of the symphysis pubis, said instrument comprising an index finger sheath having a rearward extension extending towards the wrist, means to hold said extension against the back of the hand, and an axial scale on the side of said sheath corresponding to the outer side of the index finger of the hand, the zero point of said scale being substantially at the tip of the sheath so that it is spaced rearwardly from the tip of the middle finger of the hand a distance equal to the difference between the diagonal and true conjugate diameters, whereby, when the tip of the middle finger of the examining hand on the promontory of the sacrum, the point of said scale beneath the lower edge of the symphysis pubis is the length of the true conjugate diameter.

4. An obstetrical instrument adapted to be worn on the examining hand for directly measuring the true conjugate diameter from the promontory of the sacrum to the upper inner surface of the symphysis pubis, said instrument comprising a glove including an index finger sheath and a scale on said glove extending axially of said index finger sheath toward the rear of the glove, the zero point of said scale being substantially at the tip of said sheath so that it is spaced rearwardly from the tip of the middle finger of the hand a distance equal to the difference between the diagonal and true conjugate diameters, whereby, when the tip of the middle finger of the hand rests on the promontory of the sacrum, the point of said scale beneath the lower edge of the symphysis pubis is the length of the true conjugate diameter.

5. An obstetrical instrument adapted to be worn on the examining hand for directly measuring the true conjugate diameter from the promontory of the sacrum to the upper inner surface of the symphysis pubis, said instrument comprising a glove including an index finger sheath and a scale on said glove at the side of said index finger sheath corresponding to the outer side of the index finger of the hand, the zero point of said scale being substantially at the tip of said sheath so that it is spaced rearwardly from the tip of the middle finger of the hand a distance equal to the difference between the diagonal and true conjugate diameters, whereby, when the tip of the middle finger of the hand rests on the promontory of the sacrum, the point of said scale beneath the lower edge of the symphysis pubis is the length of the true conjugate diameter.

6. An obstetrical instrument adapted to be worn on the examining hand for directly measuring the true conjugate diameter from the promontory of the sacrum to the upper inner surface of the symphysis pubis, said instrument comprising a rubber glove including an index finger sheath and a scale on said glove at the side of said index finger sheath corresponding to the outer side of the index finger of the hand, the zero point of said scale being substantially at the tip of said sheath so that it is spaced rearwardly of the tip of the middle finger of the hand a distance equal to the difference between the diagonal and true conjugate diameters, whereby, when the tip of the middle finger of the hand rests on the promontory of the sacrum, the point of said scale beneath the lower edge of the symphysis pubis is the length of the true conjugate diameter.

HARRY B. BISCOW.